US008937803B2

(12) United States Patent
Hung et al.

(10) Patent No.: US 8,937,803 B2
(45) Date of Patent: Jan. 20, 2015

(54) KEYBOARD DOCK AND COMPUTER SYSTEM

(75) Inventors: Ming-Hua Hung, New Taipei (TW); Wen-Chin Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 159 days.

(21) Appl. No.: 13/404,007

(22) Filed: Feb. 24, 2012

(65) Prior Publication Data

US 2012/0307441 A1 Dec. 6, 2012

(30) Foreign Application Priority Data

Jun. 2, 2011 (TW) .............................. 100119409 A

(51) Int. Cl.
 *G06F 1/16* (2006.01)
 *G06F 3/02* (2006.01)
(52) U.S. Cl.
 CPC ................ *G06F 3/02* (2013.01); *G06F 1/1662* (2013.01); *G06F 1/1632* (2013.01)
 USPC ................................. 361/679.08; 361/679.41
(58) Field of Classification Search
 CPC ....... G06F 1/1669; G06F 1/16; G06F 1/1613; G06F 1/1649; G06F 1/1654; G06F 1/1633; G06F 1/1622; G06F 1/1632; G06F 1/1616; G06F 1/1624; G06F 1/1626; G06F 1/1662; G06F 1/1666; G06F 1/1675; G06F 1/1681; G06F 2200/1612; G06F 3/0231; H05K 7/00
 USPC ............. 361/679.01, 679.02, 679.08, 679.21, 361/679.22, 679.26, 679.27–679.3, 361/679.55–679.58, 679.33, 679.41; 710/303–305; 345/168–172
 See application file for complete search history.

(56) References Cited

U.S. PATENT DOCUMENTS

| 4,571,456 A * | 2/1986 | Paulsen et al. ................. 379/457 |
| 6,430,038 B1 * | 8/2002 | Helot et al. .............. 361/679.05 |

(Continued)

FOREIGN PATENT DOCUMENTS

| CN | 201741069 | 2/2011 |
| TW | 201020403 A | 6/2010 |

(Continued)

OTHER PUBLICATIONS

"Office Action of Taiwan Counterpart Application" with partial English translation thereof, issued on Dec. 26, 2013, p. 1-p. 10, in which the listed references were cited.

(Continued)

*Primary Examiner* — Anthony Haughton
*Assistant Examiner* — Ingrid Wright
(74) *Attorney, Agent, or Firm* — Jianq Chyun IP Office

(57) ABSTRACT

A keyboard dock and a computer system are provided. The computer system includes a portable computer and the keyboard dock. The keyboard dock includes a base, a supporting plate, a first bracket, a sleeve and a second bracket. The base has a keyboard module. The supporting plate is used for supporting the portable computer. Ends of the first bracket are pivotally connected to the base and the supporting plate respectively. The sleeve is movably assembled to the first bracket. One end of the second bracket is pivotally connected to the sleeve, and another end of the second bracket is pivotally connected to the base or the supporting plate. The second bracket is shorter than the first bracket. The supporting plate covers the base in a first state. The supporting plate obliquely stands on the base in a second state, and the keyboard module is not covered by the supporting plate.

16 Claims, 6 Drawing Sheets

(56) References Cited

U.S. PATENT DOCUMENTS

| | | |
|---|---|---|
| 7,059,576 B2 | 6/2006 | Chen et al. |
| 7,068,496 B2 * | 6/2006 | Wong et al. ............... 361/679.28 |
| 7,280,348 B2 * | 10/2007 | Ghosh ....................... 361/679.27 |
| 7,586,743 B2 * | 9/2009 | Lin ........................... 361/679.55 |
| 7,922,132 B2 | 4/2011 | Saez et al. |
| 2005/0139740 A1 | 6/2005 | Chen et al. |
| 2008/0232061 A1 * | 9/2008 | Wang et al. .................... 361/686 |
| 2010/0081473 A1 * | 4/2010 | Chatterjee et al. ............. 455/559 |
| 2011/0038105 A1 * | 2/2011 | Liu et al. .................. 361/679.01 |

FOREIGN PATENT DOCUMENTS

| | | |
|---|---|---|
| TW | 201116193 A | 5/2011 |
| TW | M404419 | 5/2011 |

OTHER PUBLICATIONS

"Office Action of Taiwan Counterpart Application", issued on Jul. 22, 2014, with English translation thereof, p. 1-p. 7.

"Office Action of China Counterpart Application", issued on Oct. 21, 2014, pp. 1-14, with English translation thereof.

* cited by examiner

KEYBOARD DOCK AND COMPUTER SYSTEM

CROSS-REFERENCE TO RELATED APPLICATION

This application claims the priority benefit of Taiwan application serial no. 100119409, filed on Jun. 2, 2011. The entirety of the above-mentioned patent application is hereby incorporated by reference herein and made a part of this specification.

BACKGROUND OF THE INVENTION

1. Field of the Invention

The invention relates to a dock and a system, and particularly relates to a keyboard dock and a computer system.

2. Description of Related Art

A touch screen is used to input control signal in conventional tablet computer. However, the convenience in operation of the touch screen still does not satisfy the demand of users, so the related external docking keyboard has come up. The conventional external docking keyboard includes a keyboard module having a base and a supporting mechanism disposed on the base. The conventional external docking keyboard uses the supporting mechanism which can pivotally rotate relatively to the base to support the tablet computer, for example, ROC patent No. 545858 and ROC patent No. 1295705. However, the operation process of the above mentioned conventional external docking keyboard is complicated and the supporting stability is rather poor. Furthermore, the keyboard module of the conventional external docking keyboard is exposed outside and easy to be damaged due to pollutant such as dust, water or the like. Thus, the issue how to improve the supporting stability and the convenience in operation of the external docking keyboard has become one of the most important issues to the current computer manufacturing industry.

SUMMARY OF THE INVENTION

The present invention provides a keyboard dock capable for preventing the keyboard module from being damaged by pollutant and improving the supporting stability.

The present invention provides a computer system capable to solve the inconvenience problem of the mere touch screen operation.

The keyboard dock of the present invention includes a base, a supporting plate, a first bracket, a sleeve and a second bracket. The base has a keyboard module. The supporting plate is used for supporting a portable computer. Two ends of the first bracket are pivotally connected to the base and the supporting plate respectively. The sleeve is movably assembled to the first bracket. An end of the second bracket pivotally connected to the sleeve, and another end of the second bracket pivotally connected to the base or the supporting plate. The second bracket is shorter than the first bracket. In a first state the supporting plate covers the base. In a second state the supporting plate obliquely stands on the base and the keyboard module is not covered by the supporting plate.

The computer system of the present invention includes a portable computer and the keyboard dock. The keyboard dock includes a base, a supporting plate, a first bracket, a sleeve and a second bracket. The base has a keyboard module. The supporting plate is used for supporting the portable computer. Two ends of the first bracket are pivotally connected to the base and the supporting plate respectively. The sleeve is movably assembled to the first bracket. An end of the second bracket pivotally connected to the sleeve, and another end of the second bracket pivotally connected to the base or the supporting plate. The second bracket is shorter than the first bracket. In a first state the supporting plate covers the base. In a second state the supporting plate obliquely stands on the base and the keyboard module is not covered by the supporting plate.

In an embodiment of the present invention, an end of the first bracket is pivotally connected to a middle of a width direction of the supporting plate.

In an embodiment of the present invention, an end of the first bracket is pivotally connected to a side of the base distant from the keyboard module.

In one embodiment of the present invention, the keyboard dock further includes a first torsion spring and a second torsion spring, used to drive the keyboard dock to transform from the first state to the second state. The first torsion spring is disposed between the first bracket and the base. The second torsion spring is disposed between the second bracket and the supporting plate.

In one embodiment of the present invention, the keyboard dock further includes a compression spring, an end of the compression spring connected to the sleeve, another end of the compression spring connected to the end of the first bracket which is pivotally connecting the base, used to drive the keyboard dock transform from the first state to the second state.

In one embodiment of the present invention, a material of the first bracket, the sleeve and the second bracket is metal.

In one embodiment of the present invention, the keyboard dock further includes a pin set disposed beside the keyboard module of the base and electrically connected to the keyboard module. In the second state the pin set is used to electrically connect to the portable computer on the supporting plate. In addition, for example, the pin set has a magnet used to magnetically attract the portable computer on the supporting plate in the second state.

In one embodiment of the present invention, the base further has a stopping portion, and the supporting plate leans against the stopping portion in the second state.

In light of the above, in the keyboard dock and the computer system of the present invention, brackets are used to stably support the portable computer and connect the portable computer and the keyboard so as to improve the convenience in operation.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
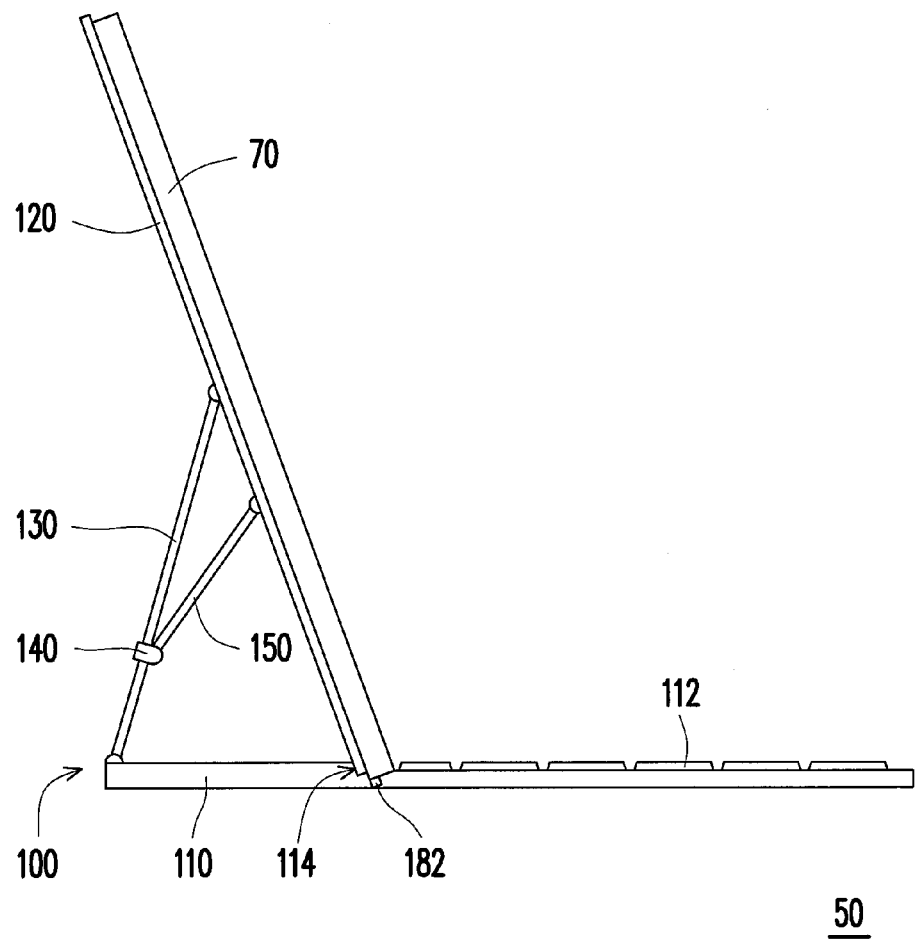
FIG. 1 is a schematic side view of a computer system and a keyboard dock according to one embodiment of the present invention.

FIG. 1 is a schematic side view of a computer system and a keyboard dock according to one embodiment of the present invention. Referring to FIG. 1, the computer system 50 of the present embodiment includes a portable computer 70 and a keyboard dock 100. The keyboard dock 100 includes a base 110, a supporting plate 120, a first bracket 130, a sleeve 140 and a second bracket 150. The base 110 has a keyboard module 112. The supporting plate 120 is used for supporting the portable computer 70. Two ends of the first bracket 130 are pivotally connected to the base 110 and the supporting plate 120 respectively. That is, the first bracket 130 can rotate relative to the base 110, and the first bracket 130 can also rotate relative to the supporting plate 120. The sleeve 140 is movably assembled to the first bracket 130, i.e., the sleeve 140 can slide along the first bracket 130. An end of the second bracket 150 pivotally connected to the sleeve 140, i.e., the second bracket 150 can rotate relative to the sleeve 140. Another end of the second bracket 150 pivotally connected to the supporting plate 120, i.e., the second bracket 150 can rotate relative to the supporting plate 120. The second bracket 150 is shorter than the first bracket 130.

In the state as shown in FIG. 1, the supporting plate 120 obliquely stands on the base 110 and the keyboard module 112 is not covered by the supporting plate 120. In other words, in this state the supporting plate 120 is neither perpendicular nor parallel to the base 110. The portable computer 70 can be disposed on the supporting plate 120 so that the user can comfortably watch the displayed image of the portable computer 70. In addition, a wired or wireless connection between the keyboard module 112 and the portable computer 70 can be selectively set up. And thus, the user can input signals to the portable computer 70 through the keyboard module 112 and control the portable computer 70. In the meanwhile, since the first bracket 130 and the second bracket 150 provides a sufficient support, the portable computer 70 is prevented from shaking when the user is touching the touch screen of the portable computer 70.

Figure 2:
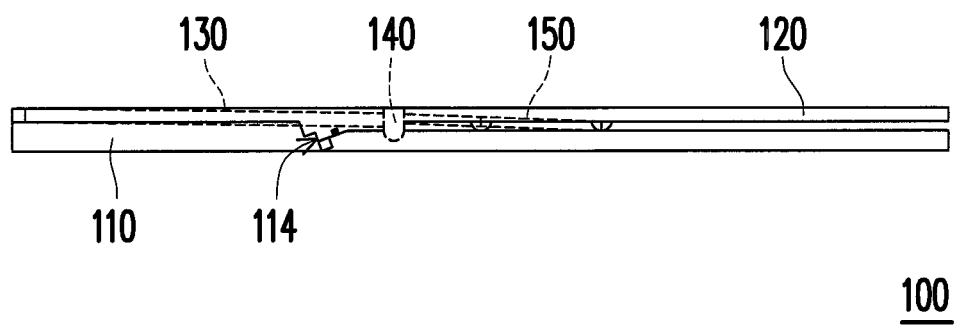
FIG. 2 is a schematic side view of the keyboard dock in FIG. 1 in another state.

When the keyboard dock 100 has to be stored, the supporting plate 120 can be rotated in the counter clockwise direction in FIG. 1, in the meanwhile the first bracket 130 and the second bracket 150 are driven to rotate in the clockwise direction, and then the keyboard dock 100 is in another state as shown in FIG. 2. In the state shown in FIG. 2, the supporting plate 120 covers the base 110. Thus, the keyboard module 112 is prevented from being polluted by dust, water, or pollutant, or the like so that the keyboard module 112 is maintained in a good status. The keyboard 112 is omitted in FIG. 1 in order to clearly indicate the positions of the first bracket 130 and the second bracket 150.

Figure 3:
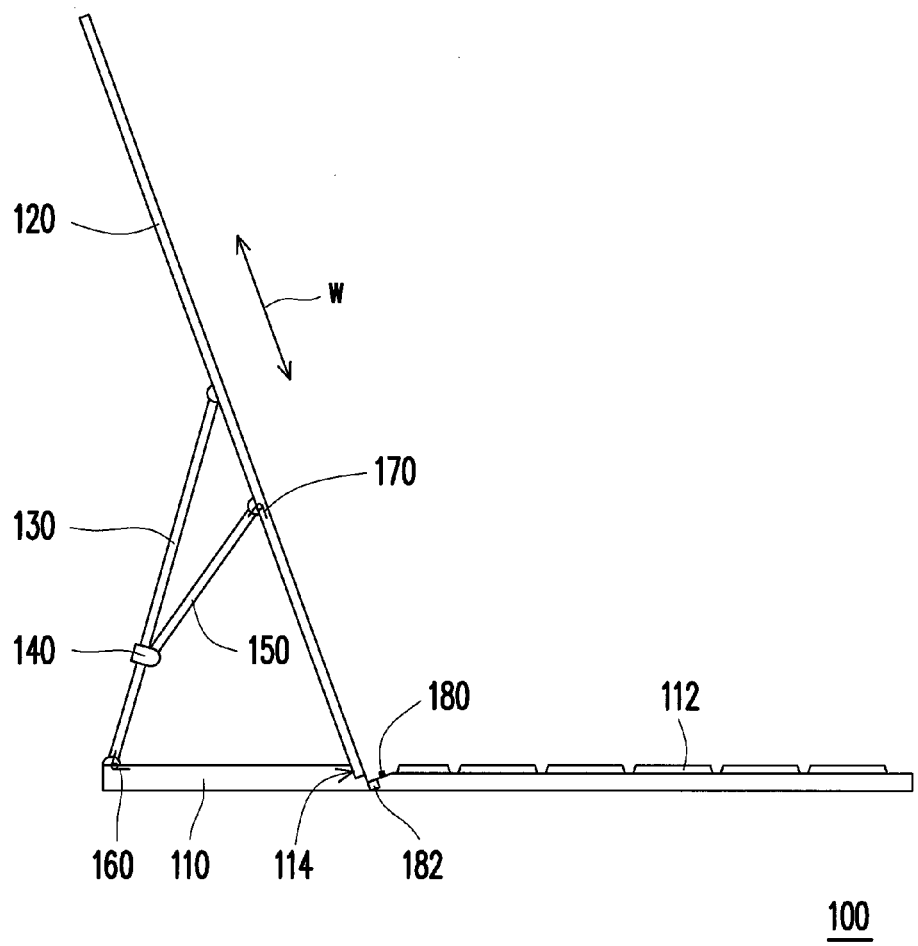
FIG. 3 is a schematic side view of the keyboard dock in FIG. 1.

FIG. 3 is a schematic side view of the keyboard dock in FIG. 1. Referring to FIG. 3, in the embodiment, an end of the first bracket 130 is pivotally connected to a middle of a width direction W of the supporting plate 120. That is, as shown in FIG. 3, an end of the first bracket 130 is pivotally connected to the middle of the supporting plate 120. However, the present invention is not limited to this embodiment. In the embodiment, an end of the first bracket 130 is pivotally connected to a side of the base 110 distant from the keyboard module 112. Thus, when the supporting plate obliquely stands on the base 110, the user located near the side of the keyboard module 112 may not see the first bracket 130. In the embodiment, metal is used as the material of the first bracket 130, the sleeve 140 and the second bracket 150 in order to obtain a better structural strength. However, the material of the first bracket 130, the sleeve 140 and the second bracket 150 can be different according to another purpose. In the embodiment, the base 110 further has a stopping portion 114. In the state shown in FIG. 3, the supporting plate 120 leans against the stopping portion 114. The stopping portion 114 can keep the angle between the supporting plate 120 and the base 110 in a fixed angle of an optimal design and provide a sufficient stable strength.

In the embodiment, the keyboard dock 100 further includes a first torsion spring 160 and a second torsion spring 170, used to drive the keyboard dock 100 to transform from the first state shown in FIG. 2 to the second state shown in FIG. 3. The first torsion spring 160 is disposed between the first bracket 130 and the base 110. The second torsion spring 170 is disposed between the second bracket 150 and the supporting plate 120. In other words, under the situation of no external force, the first torsion spring 160 exerts force between the first bracket 130 and the base 110, so that the first bracket 130 rotates in a counter clockwise direction. Simultaneously, the second torsion spring 170 exerts force between the second bracket 150 and the supporting plate 120, so that the second bracket 150 rotates in a counter clockwise direction. Finally, the supporting plate 120 is driven to rotate in a clockwise direction and the state turns into the state shown in FIG. 3. In order to fix the relative positions of the supporting plate 120 and the base 110 as shown in the storage state of FIG. 2, a slide-unlock latching structure commonly seen in notebook computers or other fixing structure can be disposed between the supporting plate 120 and the base 110. When the fixing force between the supporting plate 120 and the base 110 is released, the supporting plate 120 will automatically rotate and obliquely stand on the base 110.

In one embodiment of the present invention, the keyboard dock 100 further includes a pin set 180 disposed beside the keyboard module 112 of the base 110 and electrically connected to the keyboard module 112. The pin set 180 can be a pogo pin. In the state shown in FIG. 1 and FIG. 3, the pin set 180 is used to electrically connect to the portable computer 70 on the supporting plate 120. In other words, the signal input by the user through the keyboard module 112 can be transmitted to the portable computer 70 through the pin set 180. In addition, the pin set 180 has for example, a magnet 182 used to magnetically attract the portable computer 70 on the supporting plate 120 in the state shown in FIG. 1 and FIG. 3. More specifically, a magnet (not shown) corresponding to the magnet 182 can also be disposed on the portable computer 70 in order to strengthen the combining strength of the pin set 180 and the portable computer 70.

Figure 4:
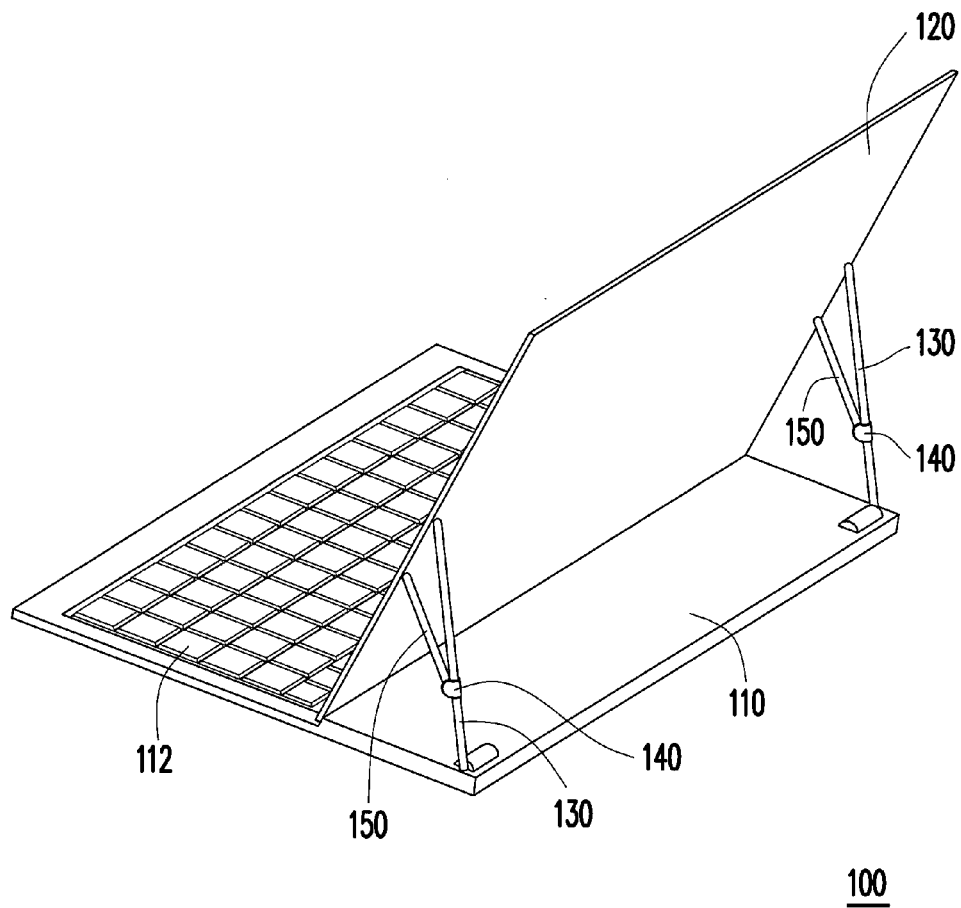
FIG. 4 is a perspective schematic view of the keyboard dock in FIG. 3.

FIG. 4 is a perspective schematic view of the keyboard dock in FIG. 3. Referring to FIG. 4, two sets of the first bracket 130, the sleeve 140 and the second bracket 150 are disposed in the keyboard dock 100 of the present embodiment. In other embodiments, the number of the first bracket 130, the sleeve 140 and the second bracket 150 can be one or more.

Figure 5:
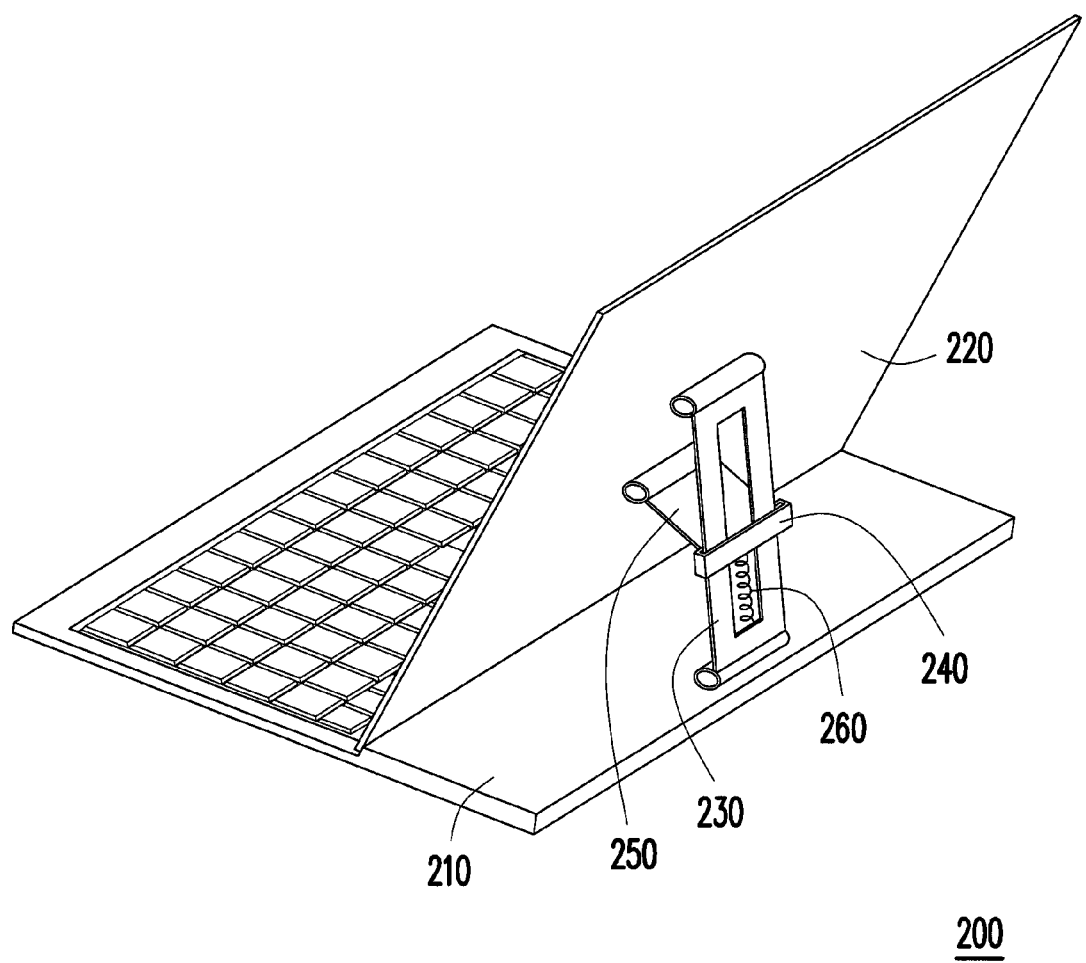
FIG. 5 is a perspective schematic view of the keyboard dock according to another embodiment of the present invention.

FIG. 5 is a perspective schematic view of the keyboard dock according to another embodiment of the present invention. Referring to FIG. 5, the keyboard dock 200 of the present embodiment is similar to the keyboard dock 100 in FIG. 3. The difference is the detailed design of the first bracket 230, the sleeve 240 and the second bracket 250. In the meanwhile, the keyboard dock 200 further includes a compression spring 260, an end of the compression spring 260 connected to the sleeve 240, another end of the compression spring 260 connected to the end of the first bracket 230 which is pivotally connecting the base 210, used to drive the keyboard dock 200 transform from the first state shown in FIG. 5 to the second state of the supporting plate 220 covering the base 210.

Figure 6:
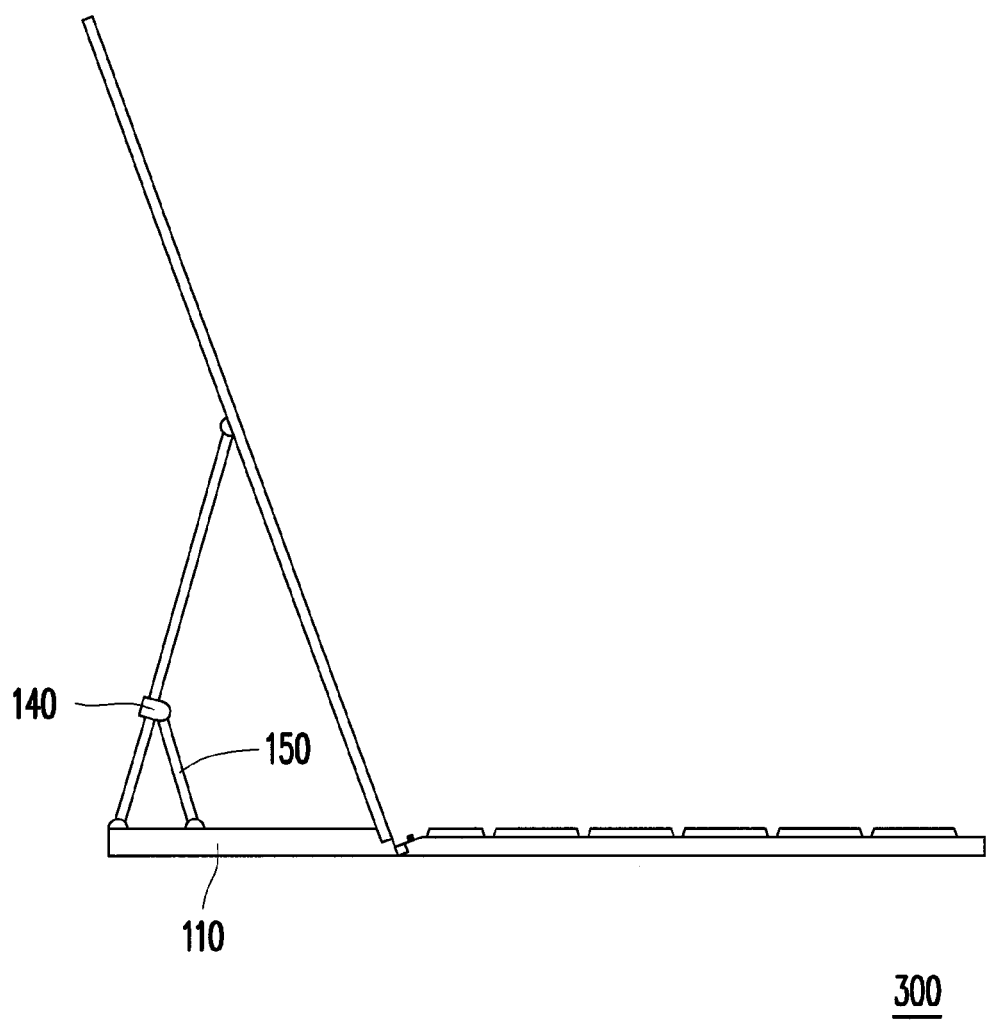
FIG. 6 is a schematic side view of the keyboard dock according to another embodiment of the present invention.

FIG. 6 is a schematic side view of the keyboard dock according to another embodiment of the present invention. Referring to FIG. 6, the keyboard dock 300 of the present embodiment is similar to the keyboard dock 100 in FIG. 3. The difference is that an end of the second bracket 150 is pivotally connected to the sleeve 140, but the other end of the second bracket 150 is pivotally connected to the base 110.

In light of the foregoing, in the keyboard dock and the computer system of the present invention, by using the brackets to connect the base of the keyboard dock and the supporting plate, the portable computer on the supporting plate can be stably supported. At the same time, the keyboard capable to connect with the portable computer is provided to improve the convenience in operation of the computer system.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A keyboard dock, comprising:
a base having a keyboard module;
a supporting plate used for supporting a portable computer;
a first bracket, two ends of the first bracket pivotally connected to the base and the supporting plate respectively;
a sleeve movably assembled to the first bracket;
a second bracket, an end of the second bracket pivotally connected to the sleeve, and another end of the second bracket pivotally connected to the base or the supporting plate, wherein the second bracket is shorter than the first bracket, in a first state the supporting plate covers the base, in a second state the supporting plate obliquely stands on the base and the keyboard module is not covered by the supporting plate; and
a pin set, disposed beside the keyboard module of the base and electrically connected to the keyboard module, wherein in the second state the pin set is used to electrically connect to the portable computer on the supporting plate.

2. The keyboard dock as claimed in claim 1, wherein an end of the first bracket is pivotally connected to a middle of a width direction of the supporting plate.

3. The keyboard dock as claimed in claim 1, wherein an end of the first bracket is pivotally connected to a side of the base distant from the keyboard module.

4. The keyboard dock as claimed in claim 1, further comprising a first torsion spring and a second torsion spring, used to drive the keyboard dock to transform from the first state to the second state, wherein the first torsion spring is disposed between the first bracket and the base, the second torsion spring is disposed between the second bracket and the supporting plate.

5. The keyboard dock as claimed in claim 1, further comprising a compression spring, an end of the compression spring connected to the sleeve, another end of the compression spring connected to the end of the first bracket which is pivotally connecting the base, used to drive the keyboard dock transform from the first state to the second state.

6. The keyboard dock as claimed in claim 1, wherein a material of the first bracket, the sleeve and the second bracket is metal.

7. The keyboard dock as claimed in claim 1, wherein the pin set has a magnet used to magnetically attract the portable computer on the supporting plate in the second state.

8. The keyboard dock as claimed in claim 1, wherein the base further has a stopping portion, and the supporting plate leans against the stopping portion in the second state.

9. A computer system, comprising:
a portable computer;
a keyboard dock, comprising:
a base having a keyboard module;
a supporting plate used for supporting the portable computer;
a first bracket, two ends of the first bracket pivotally connected to the base and the supporting plate respectively;
a sleeve movably assembled to the first bracket;
a second bracket, one end of the second bracket pivotally connected to the sleeve, and another end of the second bracket pivotally connected to the base or the supporting plate, wherein the second bracket is shorter than the first bracket, in a first state the supporting plate covers the base, in a second state the supporting plate obliquely stands on the base and the keyboard module is not covered by the supporting plate; and
a pin set, disposed beside the keyboard module of the base and electrically connected to the keyboard module, wherein in the second state the pin set is used to electrically connect to the portable computer on the supporting plate.

10. The computer system as claimed in claim 9, wherein an end of the first bracket is pivotally connected to a middle of a width direction of the supporting plate.

11. The computer system as claimed in claim 9, wherein an end of the first bracket is pivotally connected to a side of the base distant from the keyboard module.

12. The computer system as claimed in claim 9, wherein the keyboard dock further comprises a first torsion spring and a second torsion spring, used to drive the keyboard dock to transform from the first state to the second state, wherein the first torsion spring is disposed between the first bracket and the base, the second torsion spring is disposed between the second bracket and the supporting plate.

13. The computer system as claimed in claim 9, wherein the keyboard dock further comprises a compression spring, an end of the compression spring connected to the sleeve, another end of the compression spring connected to the end of the first bracket which is pivotally connecting the base, used to drive the keyboard dock transform from the first state to the second state.

14. The computer system as claimed in claim 9, wherein a material of the first bracket, the sleeve and the second bracket is metal.

15. The computer system as claimed in claim 9, wherein the pin set has a magnet used to magnetically attract the portable computer on the supporting plate in the second state.

16. The computer system as claimed in claim 9, wherein the base further has a stopping portion, and the supporting plate leans against the stopping portion in the second state.

* * * * *